May 7, 1963  E. KOMENDA  3,088,781
BEARING FOR A ROTATABLE WINDOW
Filed Aug. 9, 1960
FIG.1
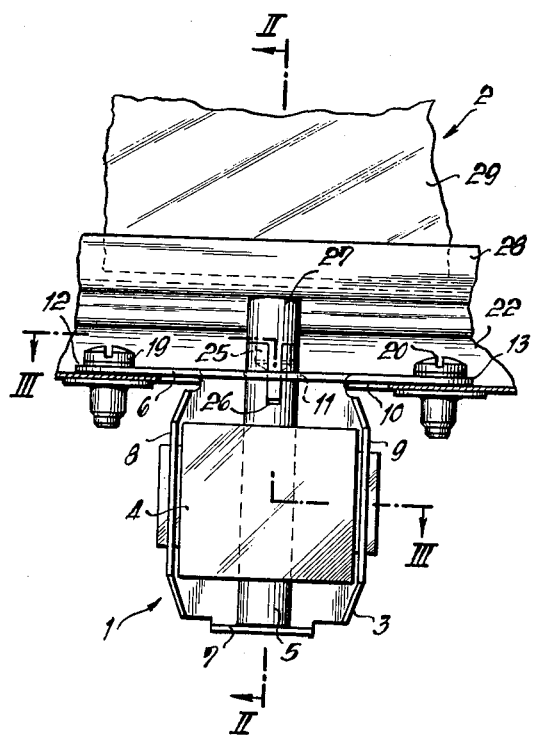
FIG.2
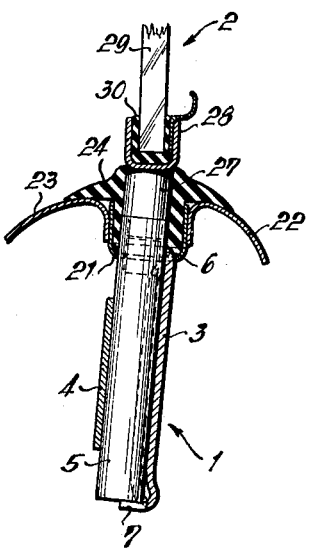
FIG.3
INVENTOR
Erwin KOMENDA
BY Dicke, Craig & Freudenberg
ATTORNEYS

United States Patent Office 3,088,781
Patented May 7, 1963

3,088,781
BEARING FOR A ROTATABLE WINDOW
Erwin Komenda, Stuttgart, Germany, assignor to Firma Dr. Ing. h.c. F. Porsche K.G., Stuttgart-Zuffenhausen, Germany
Filed Aug. 9, 1960, Ser. No. 48,486
Claims priority, application Germany Aug. 27, 1959
3 Claims. (Cl. 308—15)

The present invention relates to a bearing for rotatable windows in motor vehicles.

The basic problem underlying the present invention essentially consists in creating a bearing support for a rotatable window which is characterized by a simple construction composed of relatively few parts whereby the different parts thereof consist preferably of stamped or pressed sheet-metal parts for purposes of a rational assembly line production.

This is achieved in accordance with the present invention by providing a bearing pin for the rotatable window which is retained at a base plate by a bow-shaped spring member or curved member made of suitable spring material such as suitable hardened metal to be secured within the door. As a result thereof, the bearing in accordance with the present invention consists of a rotatable part as well as of two stamped or pressed sheet-metal parts which may be installed without any additional assembly operations. The bearing in accordance with the present invention is not disturbing to the eye since no screw or welded connections are present. The base plate thereby consists of an essentially quadrangular or rectangular stamped or pressed sheet-metal part which has a dish-shaped configuration by reason of its rim portions which are bent angularly in the same direction. All abutments and guide means effecting an unobjectionable, completely satisfactory support for the bearing pin are pressed into the base plate already during manufacture thereof. Thus, for example, the horizontally opposite rim portions of the base plate are provided with slots which serve for the accommodation therein of the bow-shaped spring member. The upper rim portion of the vertically opposite rim portions serves for purposes of securing the bearing within the door and the lower of these rim portions effects the support of the pin in the axial direction. Additionally, the base plate is provided with trough-shaped stamped or pressed-out parts in the form of recesses or indentations within which the bearing pin is supported and by means of which the bearing pin receives it radial guidance.

Accordingly, it is an object of the present invention to provide a bearing construction for a rotatable window, especially for motor vehicles, which is simple in construction, easy to manufacture and relatively inexpensive to assemble.

Another object of the present invention resides in the provision of an extremely simple bearing support for a rotatable window which is particularly suitable for mass production as well as for installation in assembly lines.

A still further object of the present invention resides in the provision of a bearing support for a rotatable window, especially for motor vehicles which consists of a minimum number of parts that may be readily installed without further operations due to the fact that the necessary abutments and guide means required for proper operation of the bearing support are obtained already in the form of appropriate configurations during the manufacturing operations of the individual parts, for example, during stamping or pressing thereof.

A still further object of the present invention lies in the provision of a bearing support for a rotatable window of motor vehicles which avoids any displeasing appearance as a result of welded or screw-threaded connections that may be noticeable to the observer of the vehicle.

Another object of the present invention resides in the provision of a bearing support for a rotatable window of vehicles which provides with extremely simple means a completely satisfactory guidance and support of the window as well as an adequate frictional support for the bearing pin thereof.

These and other objects, features and advantages of the present invention will become more obvious from the following description when taken in connection with the accompanying drawing which shows, for purposes of illustration only, one embodiment in accordance with the present invention, and wherein:

FIGURE 1 is a side elevational view of a bearing construction for a rotatable window in accordance with the present invention;

FIGURE 2 is a cross-sectional view taken along line II—II of FIGURE 1; and

FIGURE 3 is a cross-sectional view taken along line III—III of FIGURE 1.

Referring now to the drawing, wherein like reference numerals are used throughout the various views to designate corresponding parts, reference numeral 1 generally designates the bearing in accordance with the present invention which is intended for a rotatable window generally designated by reference numeral 2, for example, of a motor vehicle. The bearing 1 essentially consists of a base plate 3, a bow-shaped spring member 4 and a bearing pin 5. The base plate 3 is constructed as a generally rectangular stamped or pressed sheet-metal part and is provided on each of the four sides thereof with one rim portion 6, 7, 8 and 9, all of which are angularly bent in the same direction. The rim portion 6 is formed by a flange 10 disposed essentially perpendicularly to the base plate 3 which flange 10 is provided with a bore 11 and with extensions 12 and 13 each provided with an aperture 14, respectively. The rim portion 7 which is disposed vertically opposite to the flange 10 is constructed as a bracket arranged essentially at right angle to the base plate 3.

The two rim flanges 8 and 9 are disposed opposite one another in the horizontal direction and are disposed at an obtuse angle with respect to the base plate 3. The rim flanges 8 and 9 are each provided with a slot 15 and 16, respectively. These slots 15 and 16 serve for the accommodation of the bow-shaped spring member 4 which extends within the rim flanges 8 and 9. The bearing pin 5 is arranged intermediate the base plate 3 and the bow-shaped spring member 4 which bearing pin 5 is pressed springily against the base plate 3 by means of the bow-shaped spring member 4 made of any suitable springy material. It is thus apparent from the foregoing that the spring member 4 exercises pressure on the bearing pin and on the base plate in respectively opposite directions.

For purposes of guiding the bearing pin 5 within the base plate 3, the latter is provided with two trough-shaped indentations 17 and 18 (FIGURE 3) between which the bearing pin 5 is supported. The bearing pin 5 is secured in the radial direction by such an arrangement since the bow-shaped spring member 4 constantly urges the bearing pin 5 into the arcuate bearing portion of the base plate 3 formed between the two trough-shaped recesses 17 and 18. The bearing pin 5 is supported in the axial direction thereof by the rim portion 7 of the base plate 3.

The support or securing of the bearing assembly 1 and therewith of the base plate 3 within the door takes place by means of screws 19 and 20 which are extended through the apertures 14 in the extensions 12 and 13 and which engage threadably in nut members connected or provided preferably in the wall part 21 (FIGURE 2) of the door.

The wall part 21 of the door is formed by a stamped or pressed sheet-metal part of U-shape in cross section which effectuates the connection between the outer pressed or stamped part 22 and the inner pressed or stamped part 23 of the door and simultaneously therewith accommodates a seal 24 of suitable profile.

The bearing pin 5 is provided at the end thereof facing the rotatable window 2 with a bore 25 as well as with a slot 26 into which engages a correspondingly constructed bolt member 27. The bolt member 27 is arranged or secured at the rotatable window frame 28 in which the window pane 29 of the rotatable window 2 is supported by the interposition of an elastic sealing insert strip 30.

During pivoting of the rotatable window 2 the bearing pin 5 is rotated by means of the bolt member 27 arranged at the frame 28 of the rotatable window. Since the bearing pin 5 is pressed at all times against the base plate 3 by the bow-shaped spring member 4, the rotary movement of the rotatable window 2 can take place exclusively by overcoming the bearing friction so that the rotatable window remains stationary in any desired position into which it has been manually adjusted. The bearing friction of the bearing pin 5 on the base plate 3 can be varied by changing the abutment pressure of the bow-shaped spring member 4 and may be individually and selectively adjusted thereby in this manner.

While I have shown and described one embodiment in accordance with the present invention, it is understood that the same is not limited thereto but is susceptible of many changes and modifications within the spirit and scope of the present invention, and I, therefore, do not wish to be limited to the details shown and described herein but intend to cover all such changes and modifications as are encompassed by the scope of the appended claims.

I claim:

1. A bearing construction for a rotatable window in a motor vehicle having a relatively stationary part, comprising a vertically disposed bearing pin adapted to be secured to said window and a base plate extending substantially parallel to the axis of said bearing pin, said base plate being provided with a flange portion disposed essentially perpendicular to said base plate, said flange portion being adapted for attachment to said relatively stationary part and having a bore therein receiving said bearing pin, said base plate being further provided with a bearing portion adjacent said bore and receiving said bearing pin, a bracket portion on said base plate disposed at a right angle thereto and opposite to said flange portion, said bracket portion abutting said bearing pin and supporting the latter in the axial direction thereof, mutually facing angularly bent rim portions on opposite sides of said base plate extending substantially parallel to said bearing pin, and further supporting means for said bearing pin comprising bow-shaped spring means supported by said mutually facing rim portions and engaging said bearing pin along the major portion of its length.

2. A bearing construction according to claim 1, said base plate comprising parallel trough-shaped, stamped-out portions, said bearing portion comprising an arcuate portion disposed co-axially with said bore, said arcuate portion being disposed between said trough-shaped portions, said trough-shaped portions merging with said mutually facing rim portions.

3. A bearing construction according to claim 1, wherein said mutually facing rim portions are provided with slots, the opposite end portions of said bow-shaped spring means being received in said slots.

References Cited in the file of this patent

UNITED STATES PATENTS

| 684,074 | Luppert | Oct. 8, 1901 |
| 1,906,857 | Heyne et al. | May 2, 1933 |
| 2,260,403 | Preston | Oct. 28, 1941 |

FOREIGN PATENTS

| 424,122 | Great Britain | Feb. 12, 1935 |
| 582,073 | Great Britain | Nov. 4, 1946 |